United States Patent
Hayashi et al.

(10) Patent No.: US 11,790,703 B2
(45) Date of Patent: Oct. 17, 2023

(54) METHOD TO BE EXECUTED BY A SERVER TO EVALUATE A VEHICLE BEING USED IN DISASTER RELIEF

(71) Applicant: TOYOTA JIDOSHA KABUSHIKI KAISHA, Toyota (JP)

(72) Inventors: Masatoshi Hayashi, Nisshin (JP); Tadahiro Kashiwai, Nagoya (JP); Shintaro Matsutani, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 2 days.

(21) Appl. No.: 17/646,523

(22) Filed: Dec. 30, 2021

(65) Prior Publication Data

US 2022/0215701 A1    Jul. 7, 2022

(30) Foreign Application Priority Data

Jan. 7, 2021 (JP) ................. 2021-001671

(51) Int. Cl.
G07C 5/08 (2006.01)
G06Q 10/20 (2023.01)
G07C 5/00 (2006.01)

(52) U.S. Cl.
CPC ............ G07C 5/08 (2013.01); G06Q 10/20 (2013.01); G07C 5/008 (2013.01)

(58) Field of Classification Search
CPC .................................. G07C 5/08; G07C 5/008
See application file for complete search history.

(56) References Cited

FOREIGN PATENT DOCUMENTS

JP    2008-041032 A    2/2008
JP    2020079994    * 11/2018

* cited by examiner

Primary Examiner — Hongmin Fan
(74) Attorney, Agent, or Firm — Sughrue Mion, PLLC

(57) ABSTRACT

A method to be executed by a server includes acquiring first vehicle information, which is information regarding a vehicle before use of the vehicle for disaster relief, acquiring second vehicle information, which is information regarding the vehicle after use of the vehicle for disaster relief, and notifying an administrator of the vehicle of information regarding a difference between the acquired first vehicle information and the acquired second vehicle information.

17 Claims, 4 Drawing Sheets

METHOD TO BE EXECUTED BY A SERVER TO EVALUATE A VEHICLE BEING USED IN DISASTER RELIEF

CROSS-REFERENCE TO RELATED APPLICATION

This application claims priority to Japanese Patent Application No. 2021-001671, filed on Jan. 7, 2021, the entire contents of which are incorporated herein by reference.

TECHNICAL FIELD

The present disclosure relates to a method, a server, and a non-transitory computer readable medium.

BACKGROUND

Technology to use vehicles for disaster relief is known. For example, patent literature (PTL) 1 discloses the use of a general vehicle as a rescue vehicle during a disaster.

CITATION LIST

Patent Literature

PTL 1: JP 2008-041032 A

SUMMARY

There is a desire for improvement in technology to use vehicles for disaster relief.

It would be helpful to improve technology to use vehicles for disaster relief.

A method according to an embodiment of the present disclosure is a method to be executed by a server, the method comprising:
  acquiring first vehicle information, which is information regarding a vehicle before use of the vehicle for disaster relief;
  acquiring second vehicle information, which is information regarding the vehicle after use of the vehicle for disaster relief; and
  notifying an administrator of the vehicle of information regarding a difference between the acquired first vehicle information and the acquired second vehicle information.

A server according to an embodiment of the present disclosure includes a controller configured to:
  acquire first vehicle information, which is information regarding a vehicle before use of the vehicle for disaster relief;
  acquire second vehicle information, which is information regarding the vehicle after use of the vehicle for disaster relief; and
  notify an administrator of the vehicle of information regarding a difference between the acquired first vehicle information and the acquired second vehicle information.

A non-transitory computer readable medium according to an embodiment of the present disclosure stores a program configured to cause a computer to execute operations, the operations comprising:
  acquiring first vehicle information, which is information regarding a vehicle before use of the vehicle for disaster relief;
  acquiring second vehicle information, which is information regarding the vehicle after use of the vehicle for disaster relief; and
  notifying an administrator of the vehicle of information regarding a difference between the acquired first vehicle information and the acquired second vehicle information.

According to an embodiment of the present disclosure, technology to use vehicles for disaster relief is improved.

DETAILED DESCRIPTION

Hereinafter, an embodiment of the present disclosure will be described.

Outline of Embodiment

Figure 1:
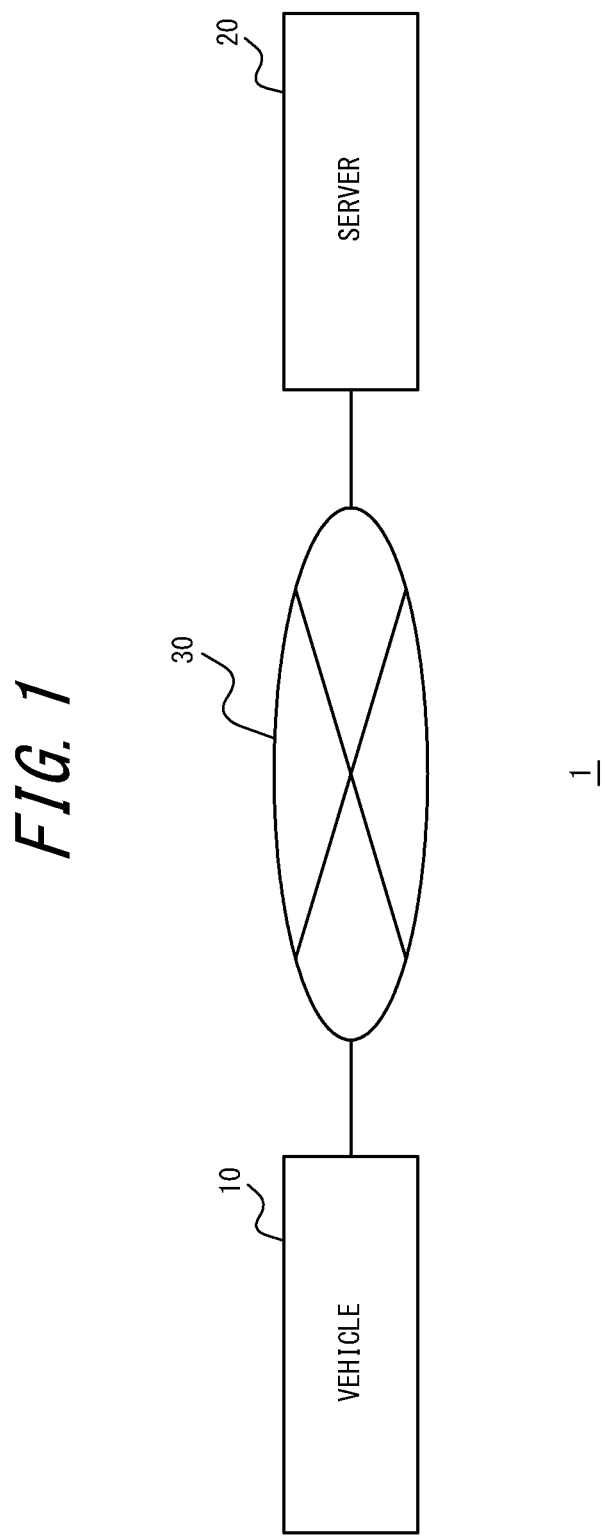
FIG. 1 is a block diagram illustrating a schematic configuration of a system according to an embodiment of the present disclosure.

An outline of a system 1 according to an embodiment of the present disclosure will be described with reference to FIG. 1. The system 1 includes a vehicle 10 and a server 20. The vehicle 10 and the server 20 are communicably connected with a network 30 including, for example, a mobile communication network, the Internet, and the like.

The vehicle 10 is an automobile, for example, but is not limited to this, and may be any appropriate vehicle. The vehicle 10 may be driven by a driver. The vehicle 10 may be capable of automated driving such as any one of Level 1 to Level 5 as defined by the Society of Automotive Engineers (SAE), for example. The number of vehicles 10 provided in the system 1 may be freely determined. The server 20 is one computer or a plurality of computers in communication with each other.

In the present embodiment, the vehicle 10 is used for disaster relief during a disaster but is used for a predetermined purpose other than disaster relief at normal times. For example, the vehicle 10 may be managed by an administrator of a car-sharing business. In this case, the vehicle 10 is used as a shared car at normal times but is used for disaster relief during a disaster. Alternatively, the system may be managed by an administrator who is an individual user of the vehicle 10. In this case, the vehicle 10 is used by the individual administrator at normal times but is used for disaster relief during a disaster. When used for disaster relief, the vehicle 10 can be driven by a worker of a disaster relief organization, for example, and dispatched to a disaster area to provide supplies or power. The mode of use for disaster relief is not limited to this example, however, and may be determined freely.

First, an outline of the present embodiment will be described, and details thereof will be described later. The server 20 acquires vehicle information (first vehicle information) regarding the vehicle 10 before use of the vehicle 10 for disaster relief. The server 20 acquires vehicle information (second vehicle information) regarding the vehicle 10 after use of the vehicle 10 for disaster relief. The server 20 then notifies the administrator of the vehicle 10 of information regarding the difference between the acquired first vehicle information and the acquired second vehicle information.

According to the present embodiment, the administrator of the vehicle 10 is thus notified of information regarding the difference in the vehicle information before and after the vehicle 10 is used for disaster relief. The administrator of the vehicle 10 can therefore check whether the vehicle 10 has been damaged, for example, while on loan to a disaster relief organization. For example, if the vehicle 10 is damaged while on loan, the administrator of the vehicle 10 could claim compensation for the damage from the disaster relief organization based on the information provided in the notification. Alternatively, if a disaster relief organization borrows the vehicle 10 from the administrator on the condition that the vehicle 10 is restored to its original condition (i.e., to the condition in which the vehicle 10 was borrowed), the administrator can check whether the vehicle 10 has been restored to its original condition by the disaster relief organization. Accordingly, technology to use vehicles 10 for disaster relief is improved in that the likelihood of the administrator of a vehicle 10 hesitating to lend the vehicle 10 for disaster relief is reduced.

Next, configurations of the system 1 will be described in detail.

(Configuration of Vehicle)

Figure 2:
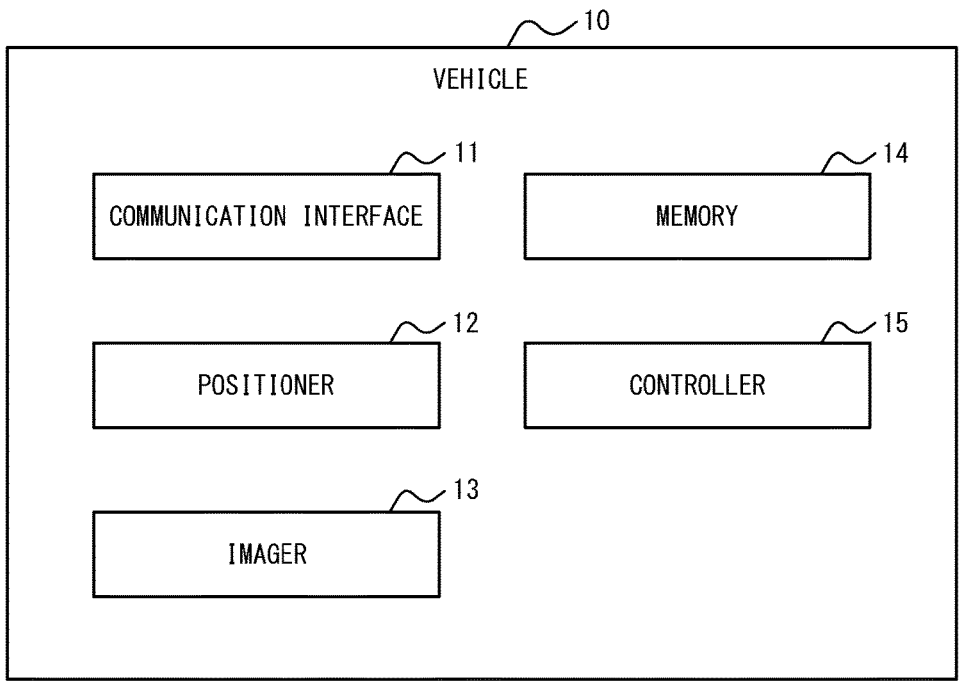
FIG. 2 is a block diagram illustrating a schematic configuration of a vehicle.

As illustrated in FIG. 2, the vehicle 10 includes a communication interface 11, a positioner 12, an imager 13, a memory 14, and a controller 15.

The communication interface 11 includes at least one communication interface for connecting to the network 30. The communication interface is compliant with mobile communication standards such as the 4th generation (4G) standard or the 5th generation (5G) standard, for example, but these examples are not limiting.

The positioner 12 includes one or more apparatuses configured to acquire positional information for the vehicle 10. Specifically, the positioner 12 includes, for example, a receiver compliant with GPS, but is not limited to this example and may include a receiver compliant with any appropriate satellite positioning system.

The imager 13 includes one or more cameras. Each camera included in the imager 13 may be installed in the vehicle 10 so as to be able to capture a subject outside or inside the vehicle, for example. The images generated by the imager 13 can, for example, be used for automatic driving control of the vehicle 10.

The memory 14 includes one or more memories. The memories are semiconductor memories, magnetic memories, optical memories, or the like, for example, but are not limited to these. The memories included in the memory 14 may each function as, for example, a main memory, an auxiliary memory, or a cache memory. The memory 14 stores any information used for operations of the vehicle 10. For example, the memory 14 may store a system program, an application program, embedded software, and the like. The information stored in the memory 14 may be updated with, for example, information acquired from the network 30 via the communication interface 11.

The controller 15 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 15 controls the operations of the entire vehicle 10.

(Configuration of Server)

Figure 3:
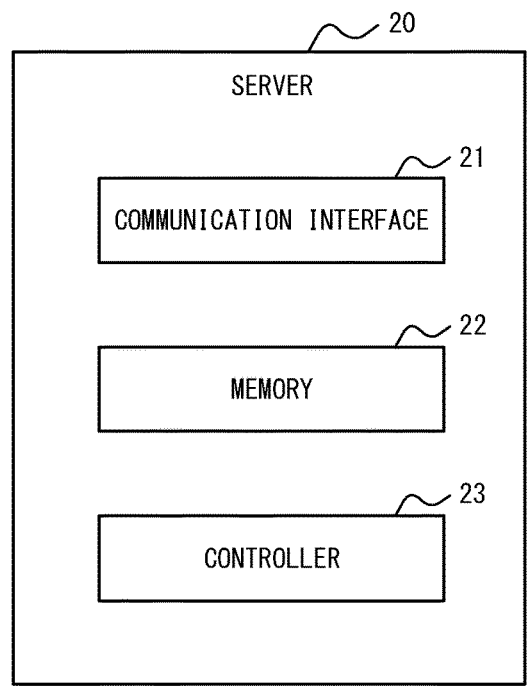
FIG. 3 is a block diagram illustrating a schematic configuration of a server.

As illustrated in FIG. 3, the server 20 includes a communication interface 21, a memory 22, and a controller 23.

The communication interface 21 includes at least one communication interface for connecting to the network 30. The communication interface may be compliant with, for example, mobile communication standards, wired local area network (LAN) standards, or wireless LAN standards, but these examples are not limiting. The communication interface may be compliant with any appropriate communication standards.

The memory 22 includes one or more memories. The memories included in the memory 22 may each function as, for example, a main memory, an auxiliary memory, or a cache memory. The memory 22 stores any information used for operations of the server 20. For example, the memory 22 may store a system program, an application program, a database, map information, and the like. The information stored in the memory 22 may be updated with, for example, information acquired from the network 30 via the communication interface 21.

The controller 23 includes at least one processor, at least one programmable circuit, at least one dedicated circuit, or a combination of these. The controller 23 controls the operations of the entire server 20.

(Server Operation Flow)

Figure 4:
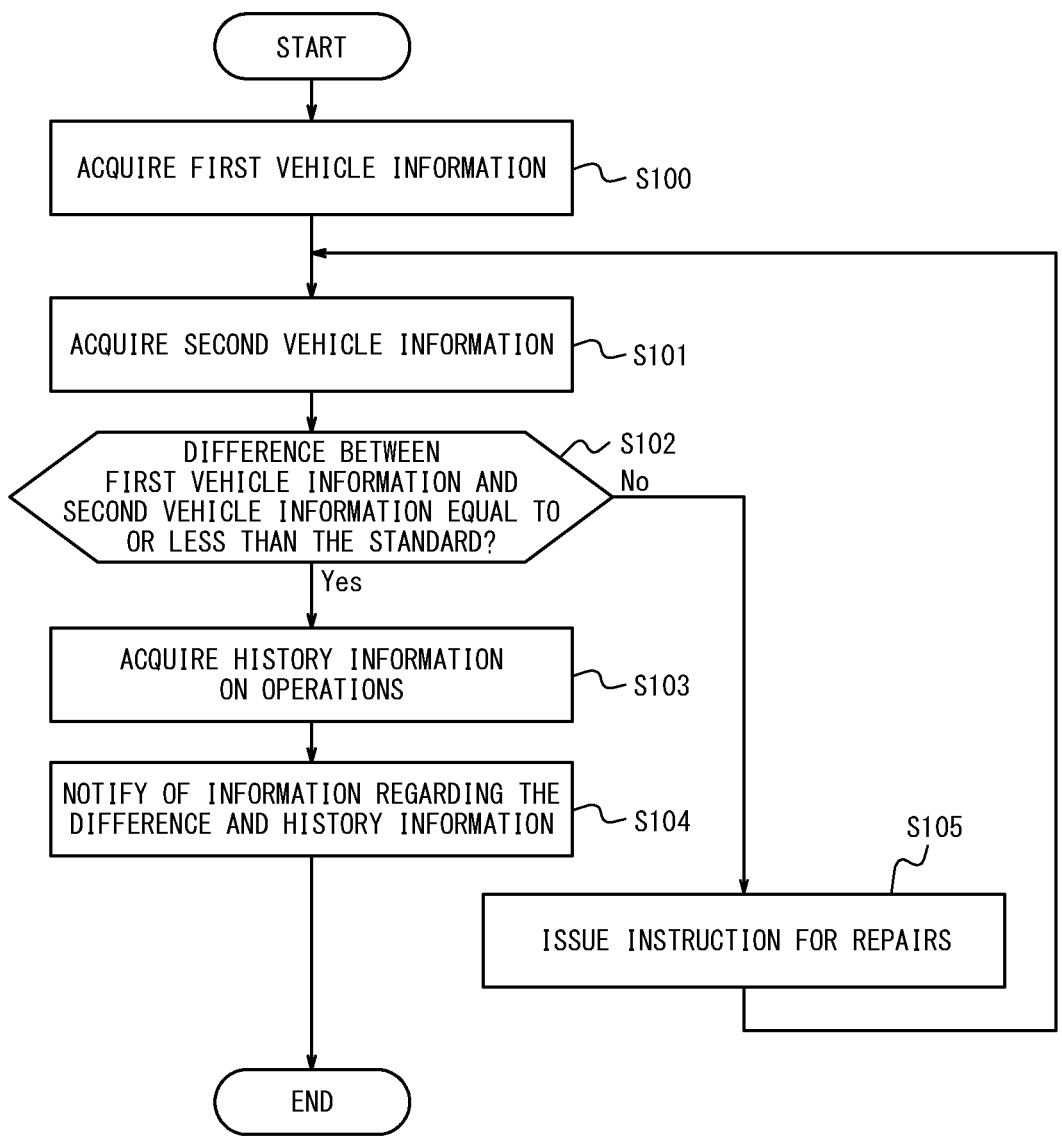
FIG. 4 is a flowchart illustrating first operations of the server.

With reference to FIG. 4, the flow of the first operations of the server 20 will be described. To summarize, the first operations are operations to notify the administrator of the vehicle 10 of information and the like regarding the difference in the vehicle information before and after the vehicle 10 is used for disaster relief.

Step S100: The controller 23 of the server 20 acquires the vehicle information regarding the vehicle 10 before use of the vehicle 10 for disaster relief as the first vehicle information.

The vehicle information includes any information on the vehicle 10 that may change as a result of the vehicle 10 being used for disaster relief. For example, the vehicle information may include a captured image of the vehicle 10 as information indicating the condition of the exterior or interior of the vehicle 10. The image is, for example, an image capturing part or all of the vehicle 10 from outside or inside the vehicle. The controller 23 may acquire an image generated by the imager 13 of the vehicle 10, before the vehicle 10 is used for disaster relief, from the vehicle 10 via the communication interface 21 as the first vehicle information. Alternatively, the controller 23 may acquire an image generated by a camera, mounted in a terminal apparatus (such as a smartphone) used by the administrator of the vehicle 10, a worker in a disaster relief organization, or another person, before the vehicle 10 is used for disaster relief. The controller 23 acquires this image from the terminal apparatus via the communication interface 21 as the first vehicle information.

The vehicle information is not limited to a captured image of the vehicle 10 but may, for example, include information indicating the results of an inspection of the vehicle 10. The inspection of the vehicle 10 may be carried out in accordance with the periodic inspection of the vehicle 10 specified by national law (such as the periodic inspection based on the Japanese automobile inspection and registration system), or the inspection may be carried out in accordance with independent inspection standards. Typically, the results of an inspection of the vehicle 10 may include information indicating whether the lighting system, brakes, various meters, and the like are functioning properly.

The timing at which the first vehicle information is generated is before the vehicle 10 is used for disaster relief. The timing at which the controller 23 acquires the generated first vehicle information, however, may be either before or after the vehicle 10 is used for disaster relief.

Step S101: The controller 23 acquires the vehicle information regarding the vehicle 10 after use of the vehicle 10 for disaster relief as the second vehicle information. The timing at which the second vehicle information is generated and the timing at which the controller 23 acquires the generated second vehicle information are both after the vehicle 10 has been used for disaster relief.

Step S102: The controller 23 determines whether the difference between the first vehicle information acquired in step S100 and the second vehicle information acquired in step S101 is equal to or less than a predetermined standard. When the difference between the first vehicle information and the second vehicle information is determined to be equal to or less than the standard (step S102: Yes), the process advances to step S103. Conversely, when the difference between the first vehicle information and the second vehicle information is determined to be greater than the standard (step S102: No), the process advances to step S105.

The difference between the first vehicle information and the second vehicle information, and the aforementioned standard used to evaluate the difference, may be freely determined in accordance with the content of the vehicle information. For example, when the vehicle information is a captured image of the vehicle 10, the controller 23 may detect a difference in the number of scratches on the vehicle 10 as the difference between the first vehicle information and the second vehicle information. The detection of scratches on the vehicle 10 can be performed using, for example, image recognition processing. The aforementioned standard may, for example, be a reference value indicated by any integer equal to or greater than 0. In this case, the controller 23 determines that the difference between the first vehicle information and the second vehicle information is equal to or less than the standard when the difference in the number of scratches on the vehicle 10 is equal to or less than the reference value. Conversely, the controller 23 determines that the difference between the first vehicle information and the second vehicle information is greater than the standard when the difference in the number of scratches on the vehicle 10 is larger than the reference value.

Step S103: when the difference between the first vehicle information and the second vehicle information is determined to be equal to less or than the standard (step S102: Yes), the controller 23 acquires history information on operations performed on the vehicle 10 while the vehicle 10 was used for disaster relief.

For example, the history information may indicate whether driving operations leading to reckless driving occurred, or whether unauthorized access to information regarding the vehicle 10 or the administrator of the vehicle 10 occurred. Examples of reckless driving include, but are not limited to, erratic steering, sudden braking, and sudden acceleration. Examples of the information regarding the vehicle 10 include, but are not limited to, the driving history of the vehicle 10. Examples of the information regarding the administrator of the vehicle 10 include, but are not limited to, personal information on the administrator. The information regarding the vehicle 10 or the administrator of the vehicle 10 may be stored in advance, for example, in the memory 14 of the vehicle 10 or in a cloud storage with which the vehicle 10 can communicate via the communication interface 11. Access to the information regarding the vehicle 10 or the administrator of the vehicle 10 may be subject to control using, for example, password authentication, biometric authentication, or access rights.

Step S104: The controller 23 notifies the administrator of the vehicle 10 of the information regarding the difference between the first vehicle information and the second vehicle information and of the history information on the operations performed on the vehicle 10.

The notification of information can be carried out by any appropriate method. For example, the controller 23 may e-mail the information using an e-mail address of the administrator of the vehicle 10 stored in advance in the memory 22. Alternatively, the controller 23 may notify the user account of the administrator of the vehicle 10 of the information. In this case, the administrator of the vehicle 10 can check the information using any terminal apparatus logged into the administrator's user account.

Step S105: When the difference between the first vehicle information and the second vehicle information is determined in step S102 to be greater than the standard (step S102: No), the controller 23 instructs that the vehicle 10 be repaired.

Specifically, the controller 23 establishes a repair plan for the vehicle 10, for example, and notifies the disaster relief organization of the repair plan to instruct the disaster relief organization to repair the vehicle 10 in accordance with the repair plan. The repair plan for the vehicle 10 may, for example, include information indicating the operator that is to repair the vehicle 10, a schedule, and information indicating the difference between the first and second vehicle information, along with the first vehicle information and the second vehicle information.

When repairs to the vehicle 10 are complete, the second vehicle information is generated anew, and the process returns to step S101. Accordingly, the controller 23 reacquires the second vehicle information in step S101 and then redetermines whether the difference between the first vehicle information and the second vehicle information is equal to or less than the standard in step S102. Consequently, the controller 23 repeatedly instructs that the vehicle 10 be repaired and reacquires the second vehicle information until the difference between the first vehicle information and the second vehicle information is determined to be equal to or less than the standard in step S102.

Figure 5:
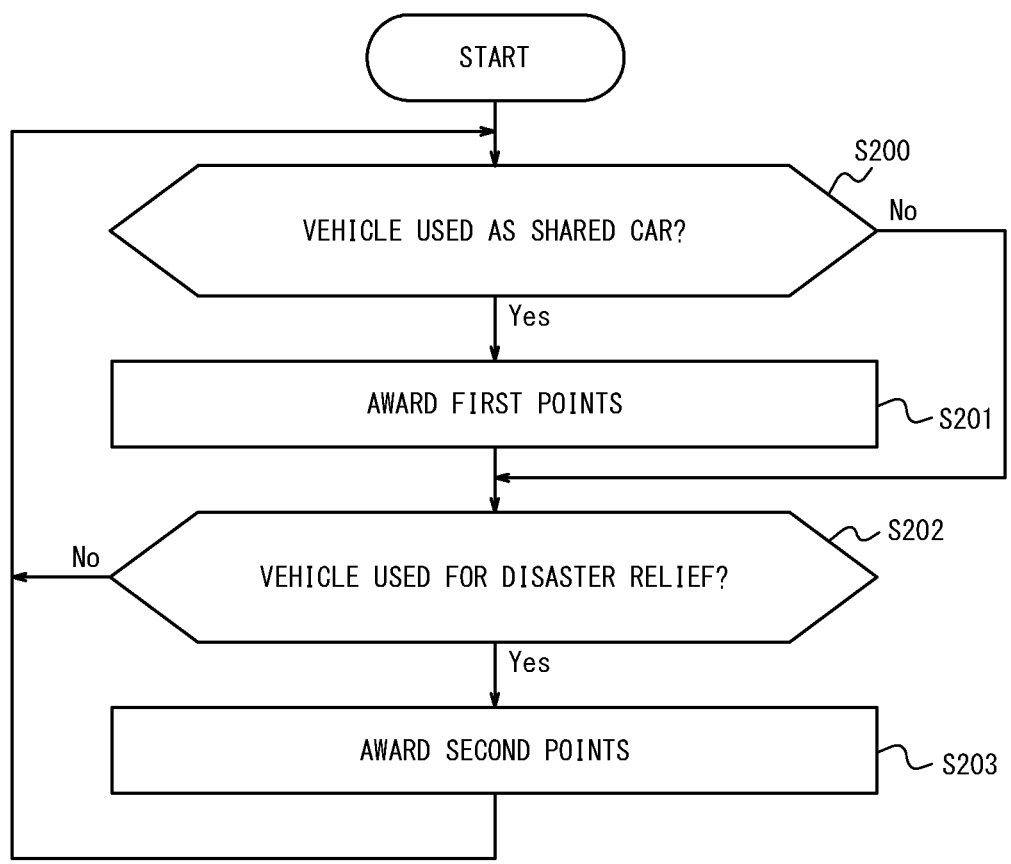
FIG. 5 is a flowchart illustrating second operations of the server.

With reference to FIG. 5, the flow of the second operations of the server 20 will be described. The vehicle 10 is described here as being used as a shared car at normal times but as being used for disaster relief during a disaster. To summarize, the second operations are operations to award different points to the administrator of the vehicle 10 when the vehicle 10 is used as a shared car and when the vehicle 10 is used for disaster relief.

Step S200: The controller 23 of the server 20 determines whether the vehicle 10 has been used as a shared car. When it is determined that the vehicle 10 has been used as a shared car (step S200: Yes), the process advances to step S201. Conversely, when it is determined that the vehicle 10 has not been used as a shared car (step S200: No), the process advances to step S202.

Specifically, upon the vehicle 10 being used as a shared car, the controller 15 of the vehicle 10 may transmit information, to the server 20, indicating a usage record of the vehicle 10 as a shared car. When the controller 23 receives this information from the vehicle 10 via the communication interface 21, the controller 23 may determine that the vehicle 10 has been used as a shared car. The usage record of the vehicle 10 as a shared car may, for example, include information such as the usage time, the distance traveled, the number of people transported, and the weight of cargo transported, although these examples are not limiting. Any information regarding the usage record of the vehicle 10 as a shared car may be included.

Step S201: when it is determined in step S200 that the vehicle 10 has been used as a shared car (step S200: Yes), the controller 23 awards first points to the administrator of the vehicle 10 in accordance with the usage record of the vehicle 10 as a shared car.

Specifically, the controller 23 determines the first points based on the usage record of the vehicle 10 as a shared car and awards the determined first points to the administrator of the vehicle 10. Examples of the first points include, but are not limited to, legal tender, electronic money, and cryptocurrency. The first points may be a benefit to be earned by the administrator of the vehicle 10 when the vehicle 10 is used as a shared car. For example, the controller 23 may increase the amount of the first points as the usage time, the distance traveled, the number of people transported, or the weight of the cargo transported during use as a shared car is greater.

Step S202: After step S201, or when it is determined in step S200 that the vehicle 10 has not been used as a shared car (step S200: No), the controller 23 determines whether the vehicle 10 has been used for disaster relief. When it is determined that the vehicle 10 has been used for disaster relief (step S202: Yes), the process advances to step S203. Conversely, when it is determined that the vehicle 10 has not been used for disaster relief (step S202: No), the process returns to step S200.

Specifically, upon the vehicle 10 being used for disaster relief, the controller 15 of the vehicle 10 may transmit information, to the server 20, indicating a usage record of the vehicle 10 for disaster relief. When the controller 23 receives this information from the vehicle 10 via the communication interface 21, the controller 23 may determine that the vehicle 10 has been used for disaster relief. The usage record of the vehicle 10 for disaster relief may, for example, include information such as the usage time, the distance traveled, the number of people transported, and the weight of cargo transported, although these examples are not limiting. Any information regarding the usage record of the vehicle 10 for disaster relief may be included.

Step S203: when it is determined in step S202 that the vehicle 10 has been used for disaster relief (step S202: Yes), the controller 23 awards second points to the administrator of the vehicle 10 in accordance with the usage record of the vehicle 10 for disaster relief. The process subsequently returns to step S200.

Specifically, the controller 23 determines the second points based on the usage record of the vehicle 10 for disaster relief and awards the determined second points to the administrator of the vehicle 10. Examples of the second points include, but are not limited to, legal tender, electronic money, and cryptocurrency. The second points may be a benefit to be earned by the administrator of the vehicle 10 when the vehicle 10 is used for disaster relief. For example, the controller 23 may increase the amount of the second points as the usage time, the distance traveled, the number of people transported, or the weight of the cargo transported for disaster relief is greater. Here, the controller 23 may set the second points higher than the first points when, for example, the actual usage such as the usage time, the distance traveled, the number of people transported, or the weight of the cargo transported are assumed to be equal during use as a shared car and use for disaster relief.

As described above, the server 20 according to the present embodiment acquires the first vehicle information regarding the vehicle 10 before use of the vehicle 10 for disaster relief. The server 20 acquires the second vehicle information regarding the vehicle 10 after use of the vehicle 10 for disaster relief. The server 20 then notifies the administrator of the vehicle 10 of information regarding the difference between the acquired first vehicle information and the acquired second vehicle information.

According to this configuration, the administrator of the vehicle 10 is notified of information regarding the difference in the vehicle information before and after the vehicle 10 is used for disaster relief. The administrator of the vehicle 10 can therefore check whether the vehicle 10 has been damaged, for example, while on loan to a disaster relief organization. For example, if the vehicle 10 is damaged while on loan, the administrator of the vehicle 10 could claim compensation for the damage from the disaster relief organization based on the information provided in the notification. Alternatively, if a disaster relief organization borrows the vehicle 10 from the administrator on the condition that the vehicle 10 is restored to its original condition (i.e., to the condition in which the vehicle 10 was borrowed), the administrator can check whether the vehicle 10 has been restored to its original condition by the disaster relief organization. Accordingly, technology to use vehicles 10 for disaster relief is improved in that the likelihood of the administrator of a vehicle 10 hesitating to lend the vehicle 10 for disaster relief is reduced.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, some or all of the operations executed by the server 20 in the above embodiment may be executed by the vehicle 10. The operations executed by the server 20 may be distributed and executed by a plurality of computers that can communicate with each other.

For example, an embodiment in which a general purpose computer functions as the server 20 according to the above embodiment can also be implemented. Specifically, a program in which processes for realizing the functions of the server 20 according to the above embodiment are written is stored in a memory of a computer, and the program is read and executed by a processor of the computer. Accordingly, the present disclosure can also be implemented as a program executable by a processor, or a non-transitory computer readable medium storing the program.

The invention claimed is:

1. A method to be executed by a server, the method comprising:

acquiring first vehicle information, which is information regarding a vehicle before use of the vehicle for disaster relief;

acquiring second vehicle information, which is information regarding the vehicle after use of the vehicle for disaster relief;

notifying an administrator of the vehicle of information regarding a difference between the acquired first vehicle information and the acquired second vehicle information; and determining whether the difference between the acquired first vehicle information and the acquired second vehicle information is equal to or less than a predetermined standard, wherein the server is configured to, when the difference between the acquired first vehicle information and the acquired second vehicle information is determined to be equal to or less than the standard, notify the administrator of the information regarding the difference.

2. The method of claim 1, further comprising:

instructing that the vehicle be repaired when the difference between the acquired first vehicle information and the acquired second vehicle information is determined to be greater than the standard; and reacquiring the second vehicle information regarding the vehicle after repair of the vehicle is completed, wherein the server is configured to repeatedly instruct that the vehicle be repaired and reacquire the second vehicle information until the difference between the acquired first vehicle information and the acquired second vehicle information is determined to be less than the standard.

3. The method of claim 1, further comprising:

acquiring history information on operations performed on the vehicle while the vehicle was used for disaster relief; and notifying the administrator of the history information.

4. The method of claim 3, wherein the history information indicates whether driving operations leading to reckless driving occurred, or whether unauthorized access to information regarding the vehicle or the administrator occurred.

5. The method of claim 1, wherein the vehicle is a vehicle that is used as a shared car at normal times and used for disaster relief during a disaster.

6. The method of claim 5, further comprising:

awarding first points to the administrator of the vehicle in accordance with a usage record of the vehicle as a shared car when the vehicle is used as a shared car; and awarding second points to the administrator of the vehicle in accordance with a usage record of the vehicle for disaster relief when the vehicle is used for disaster relief.

7. A server comprising a controller configured to:

acquire first vehicle information, which is information regarding a vehicle before use of the vehicle for disaster relief;

acquire second vehicle information, which is information regarding the vehicle after use of the vehicle for disaster relief;

notify an administrator of the vehicle of information regarding a difference between the acquired first vehicle information and the acquired second vehicle information;

determine whether the difference between the acquired first vehicle information and the acquired second vehicle information is equal to or less than a predetermined standard; and notify, when the difference between the acquired first vehicle information and the acquired second vehicle information is determined to be equal to or less than the standard, the administrator of the information regarding the difference.

8. The server of claim 7, wherein the controller is configured to:

instruct that the vehicle be repaired when the difference between the acquired first vehicle information and the acquired second vehicle information is determined to be greater than the standard;

reacquire the second vehicle information regarding the vehicle after repair of the vehicle is completed; and repeatedly instruct that the vehicle be repaired and reacquire the second vehicle information until the difference between the acquired first vehicle information and the acquired second vehicle information is determined to be less than the standard.

9. The server of claim 7, wherein the controller is configured to: acquire history information on operations performed on the vehicle while the vehicle was used for disaster relief; and notify the administrator of the history information.

10. The server of claim 9, wherein the history information indicates whether driving operations leading to reckless driving occurred, or whether unauthorized access to information regarding the vehicle or the administrator occurred.

11. The server of claim 7, wherein the vehicle is a vehicle that is used as a shared car at normal times and used for disaster relief during a disaster.

12. The server of claim 11, wherein the controller is configured to:

award first points to the administrator of the vehicle in accordance with a usage record of the vehicle as a shared car when the vehicle is used as a shared car; and award second points to the administrator of the vehicle in accordance with a usage record of the vehicle for disaster relief when the vehicle is used for disaster relief.

13. A non-transitory computer readable medium storing a program configured to cause a computer to execute operations, the operations comprising:

acquiring first vehicle information, which is information regarding a vehicle before use of the vehicle for disaster relief;

acquiring second vehicle information, which is information regarding the vehicle after use of the vehicle for disaster relief;

notifying an administrator of the vehicle of information regarding a difference between the acquired first vehicle information and the acquired second vehicle information;

determining whether the difference between the acquired first vehicle information and the acquired second vehicle information is equal to or less than a predetermined standard; and when the difference between the acquired first vehicle information and the acquired second vehicle information is determined to be equal to or less than the standard, notifying the administrator of the information regarding the difference.

14. The medium of claim 13, wherein the program is configured to cause the computer to execute the operations further comprising:

instructing that the vehicle be repaired when the difference between the acquired first vehicle information and the acquired second vehicle information is determined to be greater than the standard; and reacquiring the second vehicle information regarding the vehicle after repair of the vehicle is completed, and the computer is configured to repeatedly instruct that the vehicle be repaired and reacquire the second vehicle information until the difference between the acquired first vehicle information and the acquired second vehicle information is determined to be less than the standard.

15. The medium of claim 13, wherein the program is configured to cause the computer to execute the operations further comprising:

acquiring history information on operations performed on the vehicle while the vehicle was used for disaster relief; and notifying the administrator of the history information.

16. The medium of claim 15, wherein the history information indicates whether driving operations leading to reckless driving occurred, or whether unauthorized access to information regarding the vehicle or the administrator occurred.

17. The medium of claim 13, wherein the vehicle is a vehicle that is used as a shared car at normal times and used for disaster relief during a disaster, and the program is configured to cause the computer to execute the operations further comprising:

awarding first points to the administrator of the vehicle in accordance with a usage record of the vehicle as a shared car when the vehicle is used as a shared car; and awarding second points to the administrator of the vehicle in accordance with a usage record of the vehicle for disaster relief when the vehicle is used for disaster relief.

* * * * *